United States Patent
Claxton et al.

[15] 3,667,201
[45] June 6, 9172

[54] APPARATUS FOR HARVESTING FRUIT WITH AN ELLIPTICALLY MOVING STRIKER MEMBER

[72] Inventors: Gerald L. Claxton; Darrell C. Horn, Lafayette, Calif.

[73] Assignee: Up-Right, Inc., Berkeley, Calif.

[22] Filed: Dec. 28, 1970

[21] Appl. No.: 101,910

Related U.S. Application Data

[63] Continuation-in-part of Ser. No. 73,450, Sept. 18, 1970, abandoned, which is a continuation-in-part of Ser. No. 855,865, Sept. 8, 1969, abandoned.

[52] U.S. Cl. ................................................................ 56/330
[51] Int. Cl. ............................................................. A01g 19/00
[58] Field of Search ...................... 56/330, 331, 328, 327, 29, 56/30

[56] References Cited
UNITED STATES PATENTS

| | | | |
|---|---|---|---|
| 3,344,591 | 10/1967 | Christie et al. | 56/330 |
| 3,396,521 | 8/1968 | McKibben et al. | 56/330 |
| 3,439,482 | 4/1969 | Orton | 56/330 |
| 3,478,501 | 11/1969 | Patzlaff | 56/330 |

*Primary Examiner*—Russell R. Kinsey
*Attorney*—Mellin, Moore & Weissenberger

[57] ABSTRACT

A harvesting machine for use in harvesting fruit, such as grapes which grow on a longitudinal row of vines, in which the vines are struck with striker members to dislodge the fruit therefrom. The striker members are each translated through a generally elliptical, horizontal path as the machine moves along the row so that the speed of the striker member, into an out of the vines, transverse to the row, is maximized, and at the same time the longitudinal movement of the striker members relative to the vines during engagement therewith is minimized to prevent vine or fruit damage.

22 Claims, 10 Drawing Figures

FIG_3

FIG_2

INVENTORS
GERALD L. CLAXTON
DARRELL C. HORN

ATTORNEYS

FIG_8

FIG_9

FIG_10

INVENTORS
GERALD L. CLAXTON
DARRELL C. HORN

BY

*Mellin, Moore + Weissenberger*
ATTORNEYS

APPARATUS FOR HARVESTING FRUIT WITH AN ELLIPTICALLY MOVING STRIKER MEMBER

CROSS-REFERENCE TO RELATED APPLICATION

This application is a continuation-in-part of our co-pending application, Ser. No. 73,450, now abandoned, filed Sept. 18, 1970, which application was a continuation-in-part of our co-pending application, Ser. No. 855,865, now abandoned, filed Sept. 8, 1969 and entitled "Method And Apparatus For Harvesting Fruit With An Elliptically Moving Striker Member."

BACKGROUND OF THE INVENTION

The present invention relates to a method and apparatus for imparting horizontal transverse blows to a row of vines or bushes, so that the transverse agitation produced in the vines or bushes by such blows will cause the grapes, berries or other fruit to fall from the vines or bushes and be harvested.

Various types of harvesting means have been devised which agitate vines or bushes to remove fruit therefrom. One of these is the harvester shown in the R. M. W eygandt U.S. Pat., Nos. 3,126,692 and 3,203,159. The harvester shown in these patents operates to progressively compress the vines or bushes between vertically arranged shaker panels that slide in longitudinal relationship with the foliage of said plants, while oscillating these panels in a wig-wag phased reciprocation about axes coincident with the forward edges of these panels. In this device the vines or bushes are thus shaken back and forth to dislodge the fruit therefrom.

A serious disadvantage of the Weygandt shaking motion is that the shaking panels move in a simple, harmonic motion, wherein the fastest speed is midway in the cycle and the slowest speed (into the vine or bush) is at the end of the stroke. A sharp impact on the plant, as contrasted to a shake, is not attainable with the Weygandt simple crank method of oscillation.

Another disadvantage of the Weygandt machine is that in its operation the shaker panels are in constant sliding contact with the plant compressed thereby. This unavoidable but necessary sliding contact results in a longitudinal abrasion of the plant which rubs, smashes and otherwise damages the fruit and vines or bushes to an undesirable degree.

It is an object of the present invention to provide apparatus so that the disadvantages of the prior art devices can be overcome. More specifically, it is to provide striker members which have a maximized speed of movement when impacting a vine or bush to cause the fruit to drop therefrom. Also, it is an object of the invention to minimize longitudinal sliding contact between the striker members and the vine or bush and thus prevent damage to the fruit or vines or bushes.

SUMMARY OF THE INVENTION

Broadly speaking, the results of the present invention are obtained by utilizing one or more striker members and translating them through a generally elliptical horizontal path, the major axis of the path being normal to the row of vines or bushes. Because of the ellipticity of the path, the speed of movement of the striker member into and out of contact with the plant is substantially increased, as compared to simple harmonic motion, resulting in a substantially more efficient harvesting of the fruit.

The striker members may either be vertical rods which strike against the vines, or they may be a plurality of vertically spaced, horizontal fingers which extend generally transversely of the row of vines and which penetrate into the vines when brought into contact therewith.

Longitudinal abrasion of the plant being impacted is minimized by moving the machine along the row at a speed such that the striker member remains in engagement with substantially the same point along the row as it is moving into and out of the plant. In normal operation the striker member will be in engagement with the plant for approximately half of the stroke of the striker member. To prevent undue abrasion, the machine is moved along the row at a speed such that the machine moves through a distance of twice the minor diameter of the elliptical path during the time that the striker member completes a complete orbit of its path. As a result, even though the striker member moves through a curved path, relative to the machine, it moves in a substantially straight line, relative to the plant and normal to the rows, during the time that it is in engagement with the plant.

Other objects and advantages will become apparent in the course of the following detailed description.

BRIEF DESCRIPTION OF THE DRAWINGS

In the drawings, forming a part of this application, and in which like parts are designated by like reference numerals throughout the same.

DESCRIPTION OF THE PREFERRED EMBODIMENTS

Referring now to FIGS. 1–5, the harvesting machine 10 comprises a generally tunnel-shaped frame 11 having open side portions 12 and 13 and which frame is open at both ends so that the machine can straddle and roll, on wheels 14, along a row of bushes or vines, such as vines 15. These vines are typically trained along a wire 16 which is supported by wooden posts 17.

Figure 1:
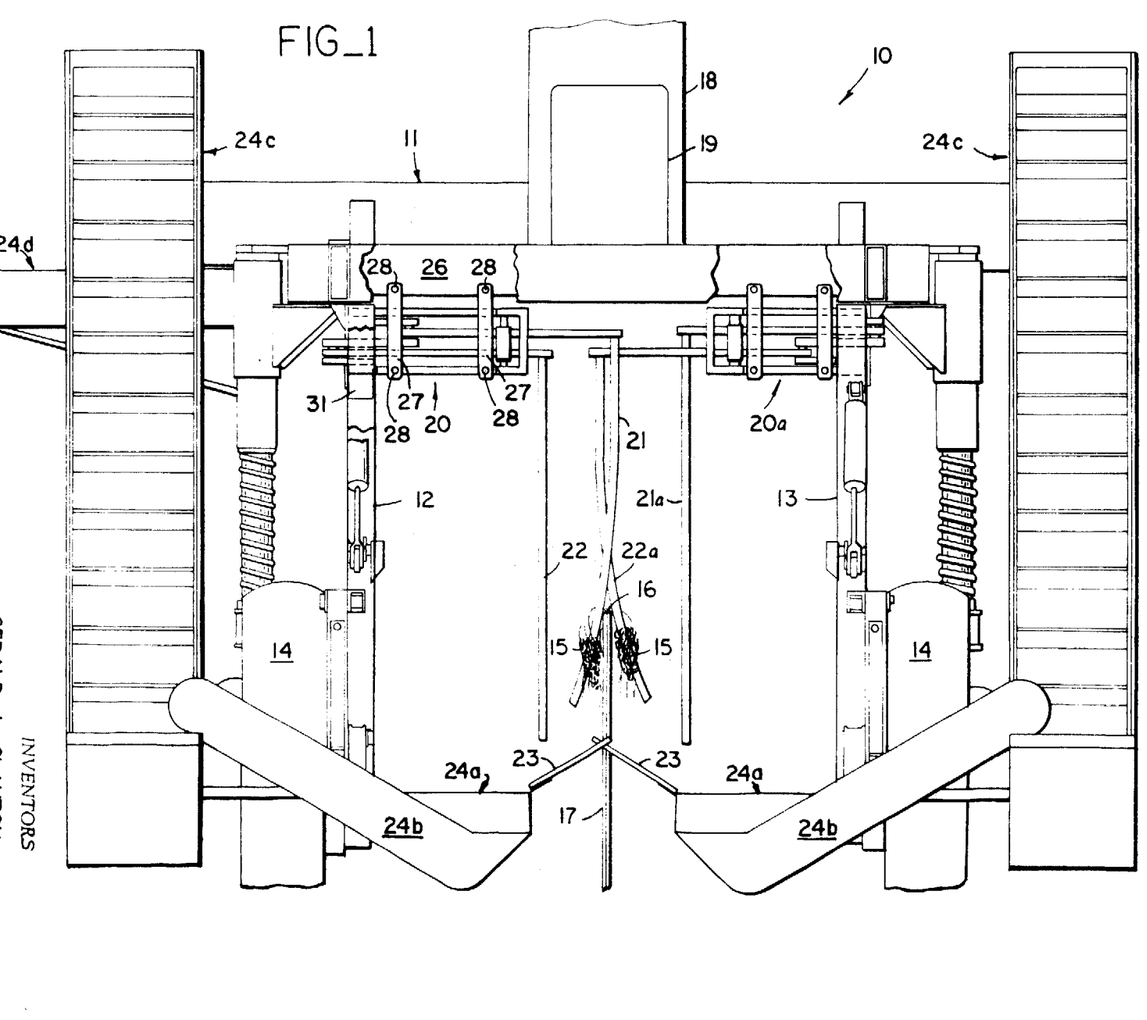
FIG. 1 is an end elevational view of a harvesting machine incorporating the invention.

The machine 10 includes an engine 18 that supplies power to wheels 14 and to a fluid pump 19 for the various hydraulic systems of the machine. Mounted on the frame at the sides thereof are the two impactor units 20 and 20a which operate the striker rods 21, 21a, 22 and 22a and cause them to impact the vines 15. Due to the impact on these vines, the grapes drop off onto the closure flaps 23 and slide down into the conveyors 24a. These conveyors carry the grapes to the rear of the machine where they are dumped into conveyors 24b, then into conveyors 24c to be carried upwardly to the cross-conveyor 24d, and then to be dumped into a truck (not shown).

The impactor units 20 and 20a are identical, and only unit 20 will be described in detail, it being understood that corresponding elements of unit 20a are identified by the same reference numerals as used with respect to unit 20, with the letter "a" appended.

Figures 2, 3:
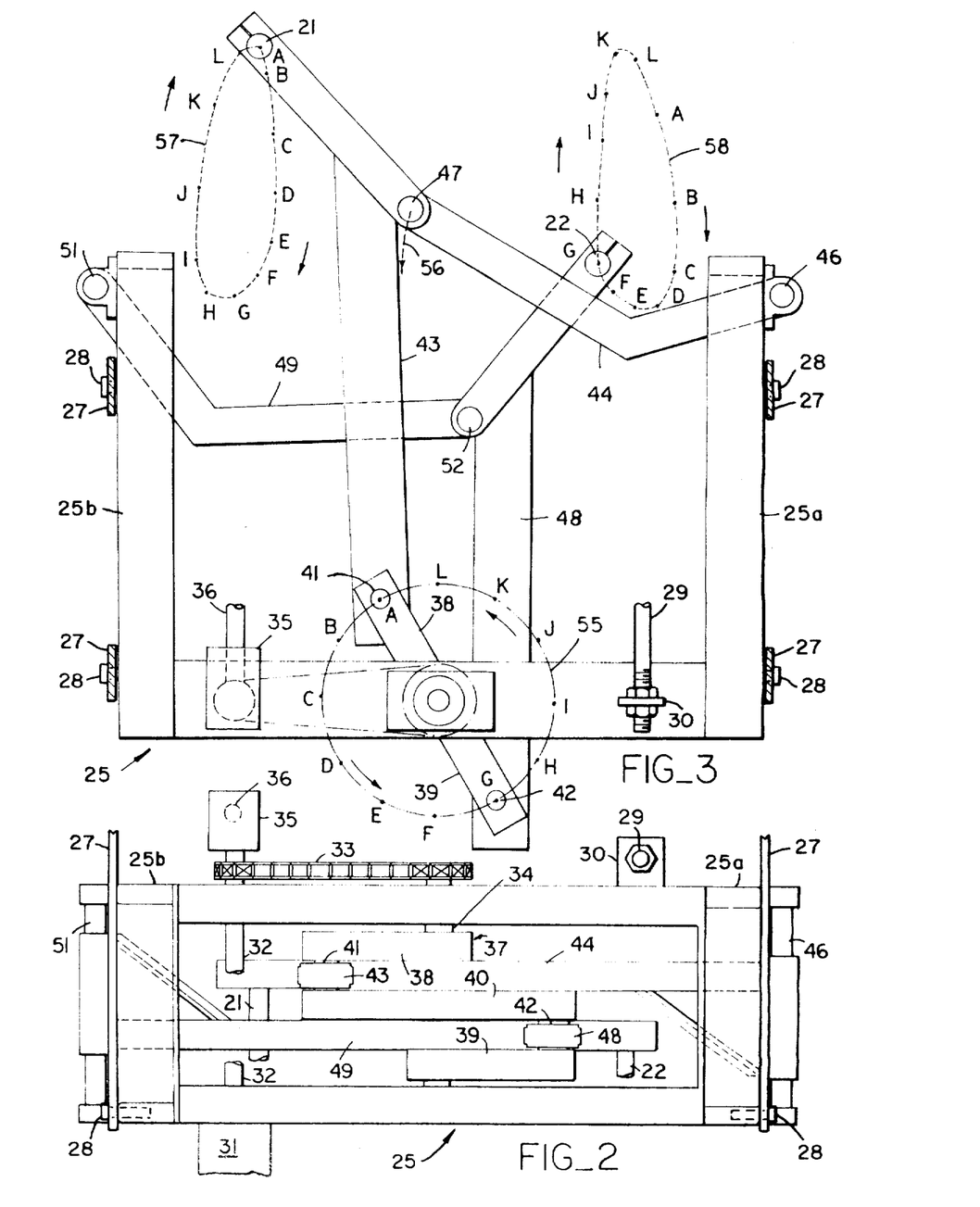
FIG. 2 is a side elevational view of one of the impactor units of the invention, detached from the machine.
FIG. 3 is a plan view of the impactor unit of FIG. 2.

Impactor unit 20 comprises a frame 25 having frame extensions 25a and 25b that extend transversely of the machine 10. The impactor unit frame is suspended from cross beams 26 of the main frame of the machine by means of rigid support straps 27 which are secured to the cross beams and impactor frame by bolts 28 so as to allow the impactor frame 25 to swing in a transverse direction relative to the main machine frame. A connecting rod 29, secured at one end thereof to tie plate 30 on the impactor frame, extends over to, and is secured to, the other impactor frame 25a so that both impactor units will swing in unison transversely of the main machine.

The frame 25 of the impactor unit 20 has mounted thereon a hydraulic motor 31 connected by suitable hydraulic lines, not shown, to pump 19. The hydraulic motor rotates the drive shaft 32, journaled in frame 25, to in turn, by means of chain 33, drive crankshaft 34. Right angle gearbox 35 transmits the rotation of drive shaft 32 to synchronizing shaft 36, which is similarly connected to the right angle gearbox 35a and the drive shaft of unit 20a so that the crankshafts 34 and 34a are driven in synchronism with each other.

Crank 37, on crankshaft 34, has upper and lower crank arms 38 and 39 that rotate in frame 25 about the vertical axis of the crankshaft 34, and extend in opposite directions from such axis. An intermediate crank member 40 is rigidly connected to crank arms 38 and 39 by pinned rods 41 and 42 so that the entire crank operates as a unitary member.

Lever 43 extending towards the longitudinal center line of machine 10 has one end pivotally connected at 41 to crank arm 39, and carries at its other, or free, end the striker rod 21 which extends generally vertically downwardly therefrom.

Lever 44 is pivotally connected at one end thereof to frame extension 25a by means of the vertical shaft 46, and is pivotally connected at its other end by pin 47 to lever 43 at a point intermediate its ends.

In a similar manner, lever 48 is pivotally connected at 42 to crank arm 39 and carries at its other end the striker rod 22. Lever 49 is pivoted to frame extension 25b by shaft 51 and to lever 48, intermediate its ends, by pin 52.

The movement of the striker rods 21 and 22 is illustrated in FIG. 3. Crank arms 38 and 39 rotate about a common vertical axis, carrying the pivot points 41 and 42 in a circular path, shown by the dotted circle 55. For purposes of illustration, this circular path 55 is marked at 30° intervals by reference letters A through L. One end of lever 43 is pivotally connected to crank arm 38 and thus this end of lever 43 travels in the circular path 55. The intermediate part of lever 43 is pivotally connected at 47 to lever 44, and thus this point on lever 43 will travel back and forth along the curve 56 whose radius is equal to the distance between pivot points 46 and 47. This compound pivotal movement of lever 43, as crank arm 38 rotates, will cause the free end of lever 43 to travel in the generally elliptical horizontal path indicated by the dotted line 57. The vertically depending striker rod 21 which is carried by the free end of lever 43 will thus be translated through the elliptical path 57.

The elliptical path 57 is shown with reference points A through L therealong to indicate the position of striker rod 21 when the crank arm 38 is at a corresponding point in its path of circular movement. Typically, the striker rod 21 will first strike the leaves and tendrils of the vine at point J and will strike the main vine shortly after it reaches point K. The striker rod will remain in contact with the leaves and tendrils until it reaches point D.

Since crank arm 38 rotates at a constant speed, the time interval between any two consecutively lettered points on circular path 55 will be constant. Correspondingly, the time interval between any two consecutively lettered points on elliptical path 57 will be constant. Thus, the greater the distance between the lettered points on path 57, the greater is the horizontal speed of the striker rod 21 between those points. As may be seen from FIG. 3, the striker rod maintains a high rate of speed throughout most of its stroke into the vine, and thus it is impacted against the main vine with a high degree of force to render a sharp blow against the vine and knock the grapes therefrom.

It is also to be noted from FIG. 3 that the striking and withdrawal speed of the striker bar into and out of the vine is greater than at the other end of the path 57, when it is out of contact with the vine and reversing direction for another impact. Because of this the striker rod provides an impacting, instead of shaking, and therefore a more efficient agitation and fruit removal.

The length of the stroke, i.e., the major diameter of the elliptical path 57 which is essentially normal to the row of vines, can of course vary, depending on the size machine and plant being harvested. For single wire-supported grape vines, a 12-inch stroke has been found to be desirable. The ellipticity of the striker rod path, while providing for sharply delivered blows, in addition makes it possible to deliver the proper rate of blows at proper intervals along the row without tearing or abrading the vine.

The proper number of blows per minute will vary in accordance with the type of plant being harvested. Typically, it will range from 250 to 500 blows per minute.

As will be seen from FIG. 3, the striker rod will contact the vine from approximately point J through point D, and during that time it will travel through a distance, parallel to the row, approximately equal to the minor diameter of the elliptical path, i.e., the direct distance between points J and D. If, at the same time, the machine is moved along the row so that it moves twice the distance of the minor diameter during one cycle of striker rod movement, then there will be a minimal amount of longitudinal movement of the striker rod relative to the vine when in contact therewith. Thus, to the vine, the striker rod will be approaching it in a direction generally perpendicular to the row to hit the vine at one point therealong and will then move away from that point in a generally perpendicular direction therefrom.

Assuming that the major and minor diameters of the elliptical path 57 are 12 and 3 inches respectively, and the striker rod is being operated at 300 cycles per minute, then the machine should be moved along the row at a ground speed of 150 feet per minute (approximately 1.75 miles per hour). With this operation the striker rod 21 will impart consecutive blows every six inches along the vine, which is a desirable spacing of blows to ensure that all the grapes will be knocked from the vine.

The striker rod 22 will similarly be translated through a generally elliptical horizontal path 58. Again, this path has reference points A through L indicated thereon to show the position of striker rod 22 when the crank arm 39 is at the corresponding points on the circular path 55.

In order to better provide a dynamic balance, and prevent undesirable transverse vibration of the machine, the striker rods 21 and 22 are preferably operated in a sufficiently out-of-phase relationship so that they do not both impact the main part of the vine at the same time.

Figure 4:
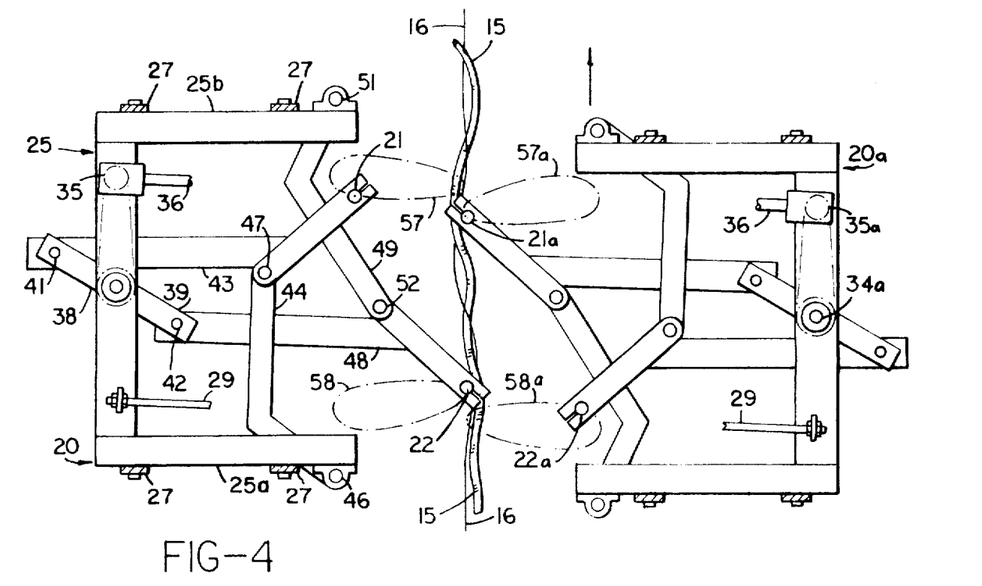
FIGS. 4 and 5 are generally schematic views of the impactor units, showing the manner in which the striker rods are impacted on a row of vines therebetween.
Figure 5:
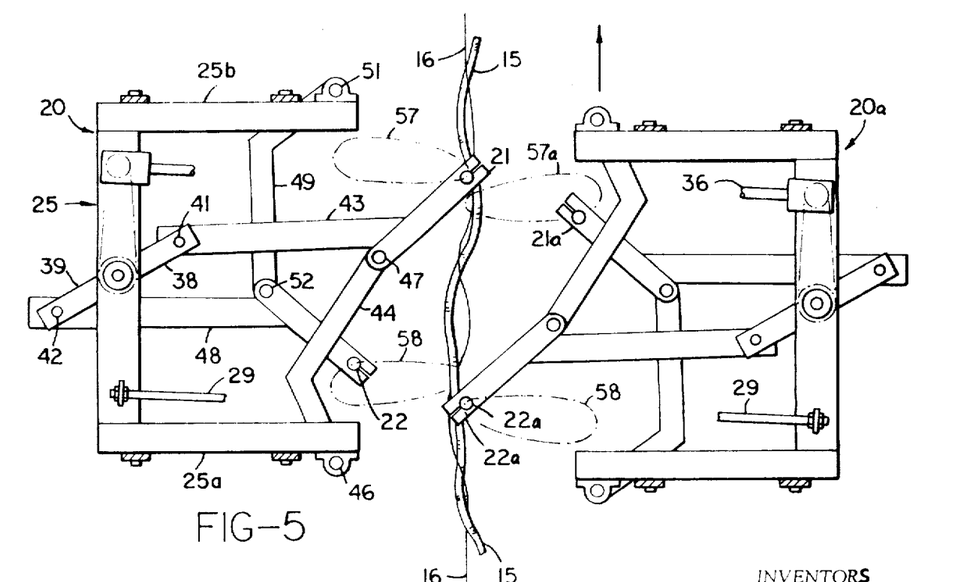

FIGS. 4 and 5 illustrate the operation of the two impactor units 20 and 20a. As will be seen, every time that the vine is impacted from one side, it is simultaneously impacted from the other side at a point spaced along the vine. Each impacting striker rod serves as a stop for the other to prevent free horizontal movement of the vine under and away from the impact of the other. For example, in FIG. 5, if striker member 21 alone struck the vine, the entire vine could move to the right and part of the impact would be lost. Such movement of the vine, however, is restricted by the opposite engagement of striker rod 22a therewith, and the impact of striker rod 21 is localized and intensified. The same, of course, is true of the impact from striker rod 22a.

As has been previously noted, the impactor units 20 and 20a are tied together by the connecting rod 29 and synchronizing shaft 36 and mounted on the machine so that they can move together transversely of the machine. This free floating arrangement, together with the balanced impact of the striker rods, will automatically center the impactor units relative to the center line of the row of vines or bushes in spite of minor errors in direction by the driver of the machine or tilting of the machine due to unevenness of the ground. As a consequence, the fruit will be more efficiently harvested and the sidewise breakage of vines, bushes, stakes and posts will be avoided.

The striker rods 21, 21a, 22 and 22a are preferably formed of a resilient material, such as thin-wall steel or aluminum tubing, or fiberglass or nylon. The striker rods will hit the vine and/or the wire supporting the vine, with a hard transverse blow sufficient to dislodge the fruit, yet if the rods encounter a trunk, post, knob, stake or other unyielding object, they will flex and yield, and minimal damage to the machinery, vine or bush will result. If desired, the striker rods can be covered with a softer material, such as rubber, to soften localized impact.

The narrowness of the striker rods also provides clearance for foliage on both sides of the bar, minimizes vine damage and permits maximum penetration of the rods into the vine. Operation of the machine at the proper ground speed, and the smoothness of these rods, prevents stems, leaves, shoots or canes from getting wound up on the rods.

Although the striker rods are shown as vertical, it will be appreciated that they could be bent to a desired configuration for particular plants so that such plants can be efficiently harvested.

The front and rear striker bars can be synchronized in their transverse oscillation to the forward speed of the harvesting machine so as to permit the sequential impacts on the side of the vine to be spaced in any desired pattern. For example, by synchronizing the oscillation of the front and rear striker rods with the speed of the machine so that the rear striker rod impacts at the same place on the vine as did the front impactor, a minimum damage of vine foliage is assured, yet with no less agitation of the vine as a whole.

Figure 6:
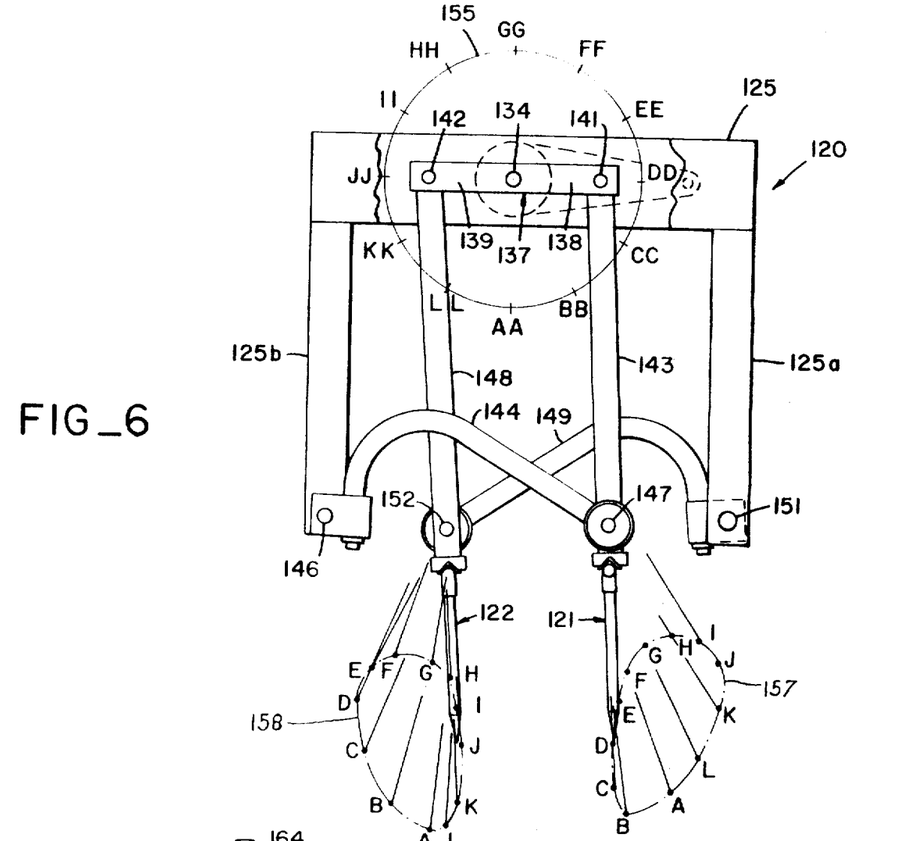
FIG. 6 is a plan view similar to FIG. 2, showing a modification of the impactor unit.
Figure 7:
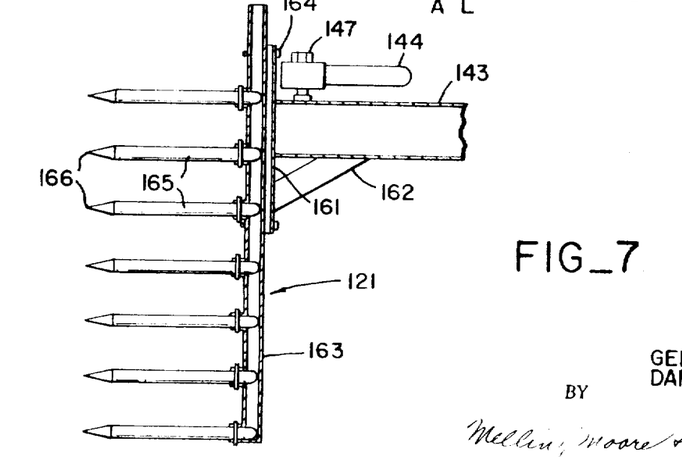
FIG. 7 is an elevational detail of a striker member of the impactor unit of FIG. 6.

FIGS. 6 and 7 illustrate a modification of the invention, wherein the striker members 121 and 122 each comprise a plurality of vertically spaced horizontal fingers which extend generally transversely of the harvesting machine.

For purposes of illustration, only the main operating elements of impactor unit 120 are shown. In use, the crankshaft would be powered by a hydraulic motor, the unit 120 would be suspended from the harvesting machine frame and the unit 120 would be tied and synchronized to a unit 120 on the opposite side of the machine, all in the same manner as previously described in connection with impactor unit 20. Alternatively, the unit 120 may be suspended from the harvesting machine and synchronized to an opposite unit 120 as described below in connection with FIGS. 8–10.

Impactor unit 120 comprises a frame 125 having frame extensions 125a and 125b that extend transversely of the machine 10. Crank 137, rotating about the vertical axis of crankshaft 134, has upper and lower crank arms 138 and 139. Lever 143, extending towards the longitudinal center line of machine 10, has one end connected at 141 to crank arm 138, and carries at its other end the striker member 121. Lever 144 is pivotally connected at 146 to frame extension 125b and at 147 to lever arm 143.

Similarly, lever 148 is connected at 142 to crank arm 139 and carries at its other end striker member 122. Lever 149 is pivotally connected at 151 to frame extension 125a and at 152 to lever 148.

As seen in FIGS. 6 and 7, lever 143 has a vertically disposed channel member 161 fixed to its end and braced by strut 162. Striker member 121 comprises a vertical tubular holder 163 designed to fit into the channel member 161 and be held in place therein by U-bolts 164. Horizontal finger members 165 are carried by holder 163, these fingers tapering at their free ends to a point 166. Typically, these fingers are made of polyurethane and are about twelve inches in length, 1 inch in diameter and located above each other on about 4-inch centers. Strike member 122 is the same as 121, and each is located above the ground at about the same height.

As before, FIG. 6 illustrates the circular path 155 of crank 137, with reference points AA through LL spaced therealong. As crank arm 138 rotates, the fingers of striker member 121 will be moved, and the points 166 thereof will move through the elliptical path 157 defined by the corresponding reference points A through L. Similarly, when the crank arm 139 is at the various reference points AA through LL of circular path 155, the points of the fingers of striker member 121 will be at the corresponding points along elliptical path 158. As shown, with a counterclockwise rotation of crank 137, the upper crank arm 138 and striker member 121 are at position DD, and the striker member is moving away from the center line of the machine. The lower crank arm 139 and striker member 122 are at position JJ, moving toward the center line of the machine. The reference lines shown in FIG. 6 extending from the reference points A through L of the elliptical paths indicate the direction of the axis of the striker member fingers at each of the points.

In operation, impactor units 120 will be mounted, one on each side, of a harvester machine 10, with the striker members at the height of the vines to be harvested. As before, the ground speed of the harvester is correlated to the speed of rotation of the cranks 137 so that the machine will travel about twice the minor diameter of the elliptical paths during one cycle of striker member movement.

Also as before, the speed of entry of the fingers into the vines is maximized so that the striking force on the vines and grape bunches, transverse to the vines, is maximized. In addition, the fingers while inserted into the vines will also impart agitation to the vines and grape bunches in a direction along the row. For example, during the time from A to B on elliptical path 157, the finger points 166 will have little relative movement with respect to the vines, since the machine is moving along the vines. However, during this time interval the horizontal directions of the axis of the fingers changes quite considerably and abruptly, causing the bodies of the fingers to impart impacting energy to the vines and bunches to aid in dislodging the bunches. Since the points of the fingers are relatively motionless with respect to the vines, the agitation of the vines is accomplished with a minimum of damage to the vines and tendrils thereof.

Withdrawal of the fingers from the vines also takes place at high speed, so that vine damage is minimized.

Figure 8:
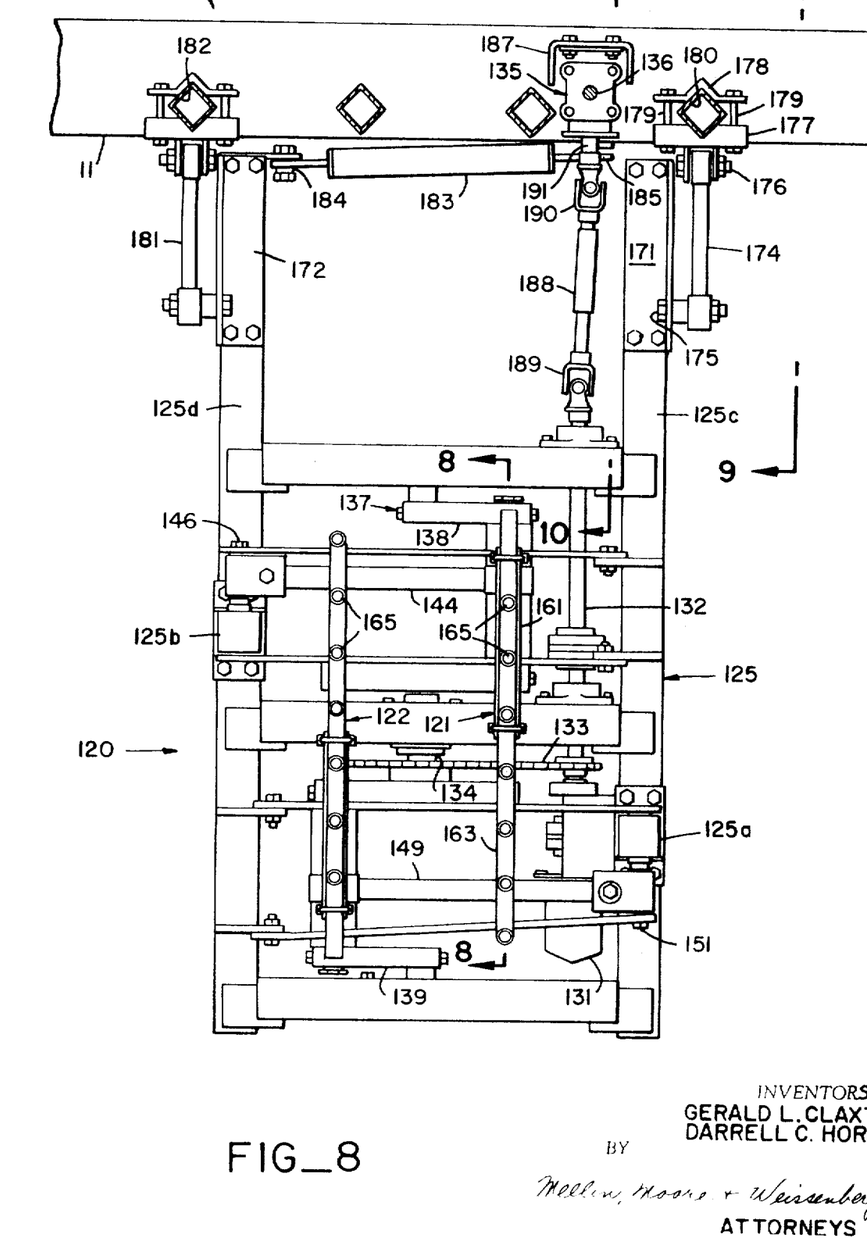
FIG. 8 is an elevational view of the impactor unit of FIG. 6, showing the manner in which the impactor unit is suspended from the frame of the machine.
Figure 9:
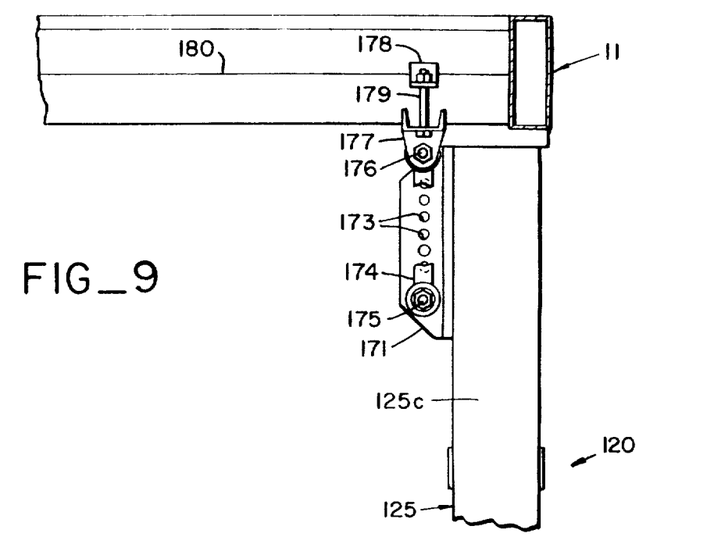
FIG. 9 is a sectional detail, taken on line 9—9 of FIG. 8.
Figure 10:
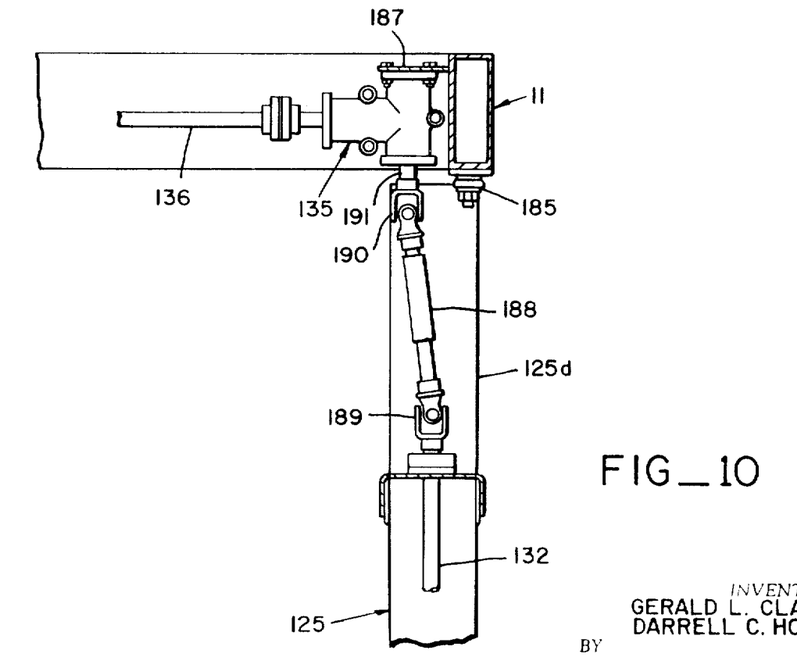
FIG. 10 is a sectional detail, taken on line 10—10 of FIG. 8.

FIGS. 8–10 illustrate a modification of the apparatus showing impactor units 120 mounted to frame 11 of the machine for movement transversely of the machine independently of each other.

Frame 125 of the impactor unit 120 is provided with upward extensions 125c and 125d which have mounting brackets 171 and 172 bolted thereto. Each mounting bracket is provided with a plurality of vertically spaced holes 173. A support bar 174 is pivotally mounted at its lower end to bolt 175 on bracket 171 and at its upper end to bolt 176 carried by lower clamp member 177. The lower clamp member 177 and upper clamp member 178 are clamped, by bolts 179, onto main frame member 180 which extends transversely of the machine from side to side thereof. Similarly, support bar 181 supports the impactor unit 120 from the transverse frame member 182. The bolts 175 and 176 being parallel to the centerline of the machine thus allow the suspended impactor unit to swing transversely of the machine.

A thrust link 183, pivotally connected at one end 184 to the impactor unit 120 and at its other end 185 to the main frame of the machine, allows transverse movement of the impactor unit relative to the main frame while preventing longitudinal relative movement therebetween.

The operation of the impactor units is maintained in synchronism as follows. The hydraulic motor 131 rotates drive shaft 132 and by chain 133 drives the crankshaft 134 of the impactor unit.

A right angle gearbox 135 is mounted on main frame bracket 187. A telescopable slip coupling 188 is connected by universal joints 189 and 190 to the drive shaft 132 and the input shaft 191 of the right angle gearbox 135, and the output shaft of the gearbox is coupled to the synchronizing shaft. This shaft extends across the machine and is similarly connected to the drive shaft 132 of the opposite impactor unit.

By the above-described arrangement each impactor unit 120 hangs freely from the main frame of the machine and on each side thereof. The position of the impactor units and striking members thereof may be easily adjusted. By loosening bolts 179, the clamping members may be slid along the transverse frame members 180 and 182 to adjust the transverse spacing of the impactor units to suit the vines therebetween. The spaced vertical holes 173 in the support brackets 171 and 172 allow the impactor units to be hung at different elevations so that the striking members will be positioned at the height of the fruit zone of the vines.

It has been found that a rigid tying together of the impactor units, as by the connecting rod 29 of FIG. 3, results in an undesirable amount of vibration as the machine operates in the harvesting of grapes. The elimination of the connecting rod, by the suspension means of FIGS. 8-10, has substantially reduced this vibration. At the same time, the suspension of FIGS. 8-10 maintains the desired spacing between the impactor units during normal harvesting operations. Each impactor unit (typically about 600 pounds in weight) hangs, as a pendulum, so that it is vertical. If the machine should tilt to the side, if the ground is uneven on each side of the row, the two impactor units will both swing transversely of the machine so that they will remain vertical and at the same distance from each other.

The inertia of the impactor units will cause them to maintain their vertical position during normal harvesting. However, if a post or large trunk is encountered by one of the impactor units, such unit can swing out, independently of the other, to allow the machine to pass the obstruction.

Having thus described our invention, we claim:

1. A machine for harvesting fruit from a row of fruited plants, comprising:
    a. a wheeled frame having upstanding side portions adapted to straddle and move longitudinally along said row,
    b. a vertically disposed striker member between said side portions of said frame,
    c. operating means carried by said frame for translating said striker member through a generally elliptical, horizontal path, the major axis of which is transverse to said frame.
2. A machine as set forth in claim 1 wherein said striker member consists of a slender rod.
3. A machine as set forth in claim 1 wherein said striker member comprises a plurality of vertically spaced, horizontal fingers which extend generally transversely of said frame.
4. A machine as set forth in claim 1, and further including:
    d. a second vertically disposed striker member between said side portions of said frame,
    e. second operating means carried by said frame for translating said second striker member through a second generally elliptical, horizontal path, the major axis of which is transverse to said frame.
5. A machine as set forth in claim 4, and further including:
    f. means for moving said first and second striker members in unison in their respective elliptical paths towards and away from the longitudinal centerline of said frame from opposite sides thereof,
    g. means enabling said elliptical paths as a whole to move in unison transversely of said frame.
6. A machine as set forth in claim 5, wherein said striker members each consist of a slender rod.
7. A machine as set forth in claim 5, wherein said striker members each comprise a plurality of vertically spaced, horizontal fingers which extend generally transversely of said frame.
8. A machine as set forth in claim 4, wherein the first and second operating means are on opposite sides of the longitudinal centerline of said frame, and further including:
    f. means suspending the upper end of each operating means from said frame for independent swinging movement of said operating means transversely of said frame.
9. A machine as set forth in claim 8 and further including:
    g. means for synchronizing the movement of said first and second striker members in their respective elliptical paths.
10. A machine as set forth in claim 4, and further including:
    f. third and fourth vertically disposed striker members between said side portions of said frame,
    g. third and fourth operating means carried by said frame for translating said third and fourth striker members through third and fourth generally elliptical, horizontal paths, the major axes of which are transverse to said frame,
    h. two of said elliptical paths each being substantially on one side of the longitudinal centerline of said frame and the other two elliptical paths being on the other side of said centerline.
11. A machine as set forth in claim 10 wherein two of said operating means are mounted on a first subframe on one side of the longitudinal centerline of said wheeled frame and the other two of said operating means are mounted on a second subframe on the opposite side of said centerline, and further including:
    i. means suspending the upper ends of said subframes from said wheeled frame for independent swinging movement of said subframes transversely of said wheeled frame.
12. A machine as set forth in claim 10, and further including means for moving two of said striker members in unison towards and away from said centerline from opposite sides thereof, and for moving the other two striker members in unison towards and away from said centerline from opposite sides thereof but in out-of-phase relation to said first two striker members.
13. A machine as set forth in claim 12 wherein each of said striker members consists of a slender rod.
14. A machine as set forth in claim 12 wherein each of said striker members comprises a plurality of vertically spaced, horizontal fingers which extend generally transversely of said frame.
15. In a harvesting machine having a wheeled frame with sides arranged to straddle and move longitudinally along a row of fruited plants, the improvement comprising:
    a. a crank arm carried by said frame, said crank arm being journaled at one end for rotation about a first vertical axis,
    b. a first lever pivotally connected at one end thereof to the other end of said crank arm,
    c. a vertically disposed striker member carried by the other end of said first lever,
    d. a second lever carried by said frame, said second lever being pivotally mounted at one end thereof for pivotal movement about a second vertical axis, said second lever being pivotally connected at the other end thereof to an intermediate point on said first lever.
16. In a machine as set forth in claim 15 and in which the horizontal distance between said first and second vertical axes is fixed.
17. In a machine as set forth in claim 15 and further including:
    e. a second crank arm carried by said frame, said second crank arm being journaled at one end thereof for rotation about a third vertical axis,
    f. a third lever pivotally connected at one end thereof to the other end of said second crank arm,
    g. a second vertically disposed striker member carried by the other end of said third lever,
    h. a fourth lever carried by said frame, said fourth lever being pivotally mounted at one end thereof about a fourth vertical axis, said fourth lever being pivotally connected at its other end to an intermediate point on said third lever.
18. In a machine as set forth in claim 17 wherein said first and third vertical axes of rotation of said first and second crank arms are on opposite sides of the longitudinal centerline of said frame.
19. In a machine as set forth in claim 18 wherein said first and second crank arms are mounted on first and second subframes respectively, and further including:
    i. means suspending the upper ends of said subframes from said wheeled frame for independent swinging movement of said subframes transversely of said wheeled frame.
20. In a machine as set forth in claim 17, wherein said first and third vertical axes are coaxial and said first and second crank arms extend in opposite directions therefrom.
21. A machine for harvesting fruit from a row of fruited plants, comprising:
    a. a wheeled frame having upstanding side portions adapted to straddle and move longitudinally along said row,
    b. first and second subframes disposed one on each side of the longitudinal centerline of said wheeled frame,
    c. a striker member associated with each of said subframes, d. operating means carried by each subframe for moving the striker member associated therewith towards and away from said centerline,
e. means suspending the upper ends of said subframes from said wheeled frame for independent swinging movement of said subframes transversely of said wheeled frame.

22. A machine as set forth in claim 21, and further including:
f. means for synchronizing the operation of said operating means whereby said striker members move in unison.

UNITED STATES PATENT OFFICE
CERTIFICATE OF CORRECTION

Patent No. 3,667,201          Dated June 6, 1972

Inventor(s) Gerald L. Claxton and Darrell C. Horn

It is certified that error appears in the above-identified patent and that said Letters Patent are hereby corrected as shown below:

The top of the first page is corrected so that the date of issue reads:

June 6, 1972

Signed and sealed this 20th day of February 1973.

(SEAL)
Attest:

EDWARD M. FLETCHER, JR.
Attesting Officer

ROBERT GOTTSCHALK
Commissioner of Patents